United States Patent
Teruyama

(10) Patent No.: US 11,677,442 B2
(45) Date of Patent: Jun. 13, 2023

(54) COMMUNICATION APPARATUS AND COMMUNICATION METHOD

(71) Applicant: SONY GROUP CORPORATION, Tokyo (JP)

(72) Inventor: Katsuyuki Teruyama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/416,941

(22) PCT Filed: Dec. 6, 2019

(86) PCT No.: PCT/JP2019/047747
§ 371 (c)(1),
(2) Date: Jun. 21, 2021

(87) PCT Pub. No.: WO2020/137437
PCT Pub. Date: Jul. 2, 2020

(65) Prior Publication Data
US 2022/0085847 A1    Mar. 17, 2022

(30) Foreign Application Priority Data
Dec. 28, 2018    (JP) .............................. JP2018-247351

(51) Int. Cl.
*H04B 5/00*    (2006.01)
(52) U.S. Cl.
CPC ................................ *H04B 5/0031* (2013.01)
(58) Field of Classification Search
CPC ...... H04B 5/0031; H04B 5/0025; H04B 5/02; H04B 5/0056; H04B 5/0043
USPC ........................................................ 455/41.1
See application file for complete search history.

(56) References Cited

U.S. PATENT DOCUMENTS

| | | | |
|---|---|---|---|
| 2009/0227282 A1* | 9/2009 | Miyabayashi | H04W 4/21 455/552.1 |
| 2010/0017570 A1* | 1/2010 | Gallo | G06F 3/0604 711/E12.001 |
| 2011/0164679 A1* | 7/2011 | Satou | H04N 19/61 375/240.03 |
| 2013/0271268 A1* | 10/2013 | Brandsma | G06K 19/0716 340/10.33 |
| 2014/0213183 A1 | 7/2014 | Reddy Badvel et al. | |

FOREIGN PATENT DOCUMENTS

| | | |
|---|---|---|
| CN | 1604130 A | 4/2005 |
| CN | 101675428 A | 3/2010 |
| CN | 102138327 A | 7/2011 |
| CN | 102906765 A | 1/2013 |
| CN | 103377387 A | 10/2013 |

(Continued)

*Primary Examiner* — Eugene Yun
(74) *Attorney, Agent, or Firm* — Paratus Law Group, PLLC

(57) ABSTRACT

A communication apparatus (100) according to the present disclosure is a communication apparatus (100) that performs non-contact communication with an external apparatus (200) via a memory (210) of the external apparatus (200). The communication apparatus (100) includes a control unit (120). The control unit (120) receives a message including a parameter related to the control of the non-contact communication. The control unit (120) performs the non-contact communication with the external apparatus (200) on the basis of the parameter.

17 Claims, 12 Drawing Sheets

(56) References Cited

FOREIGN PATENT DOCUMENTS

| | | |
|---|---|---|
| CN | 106059630 A | 10/2016 |
| JP | 2013-069277 A | 4/2013 |
| JP | 2015-115782 A | 6/2015 |
| WO | WO 2017/038319 A1 | 3/2017 |

* cited by examiner

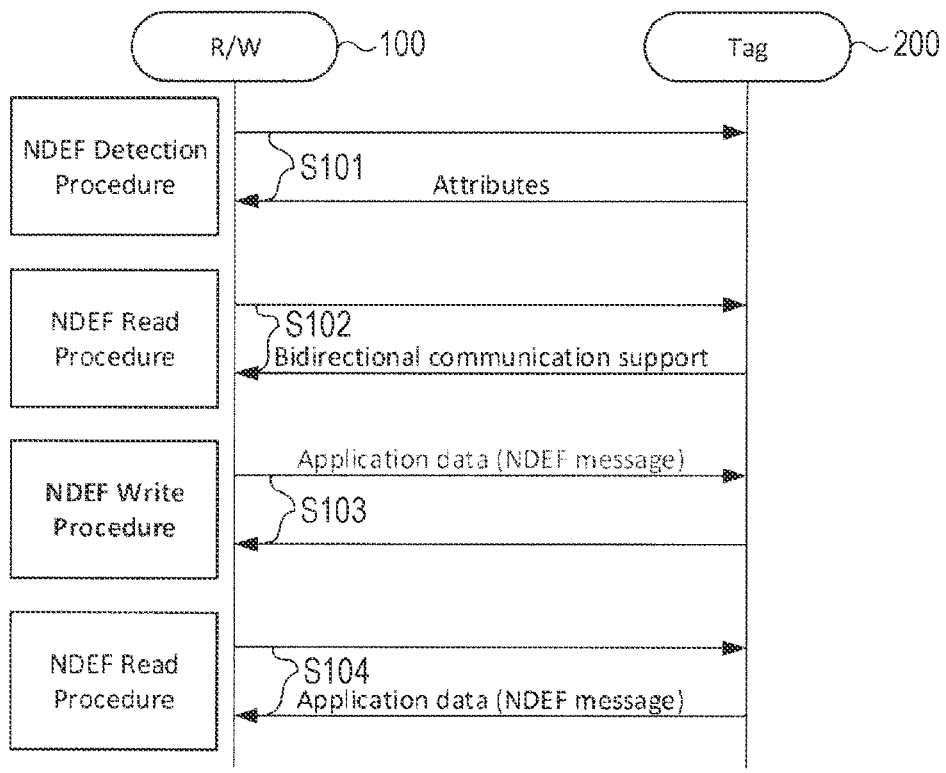
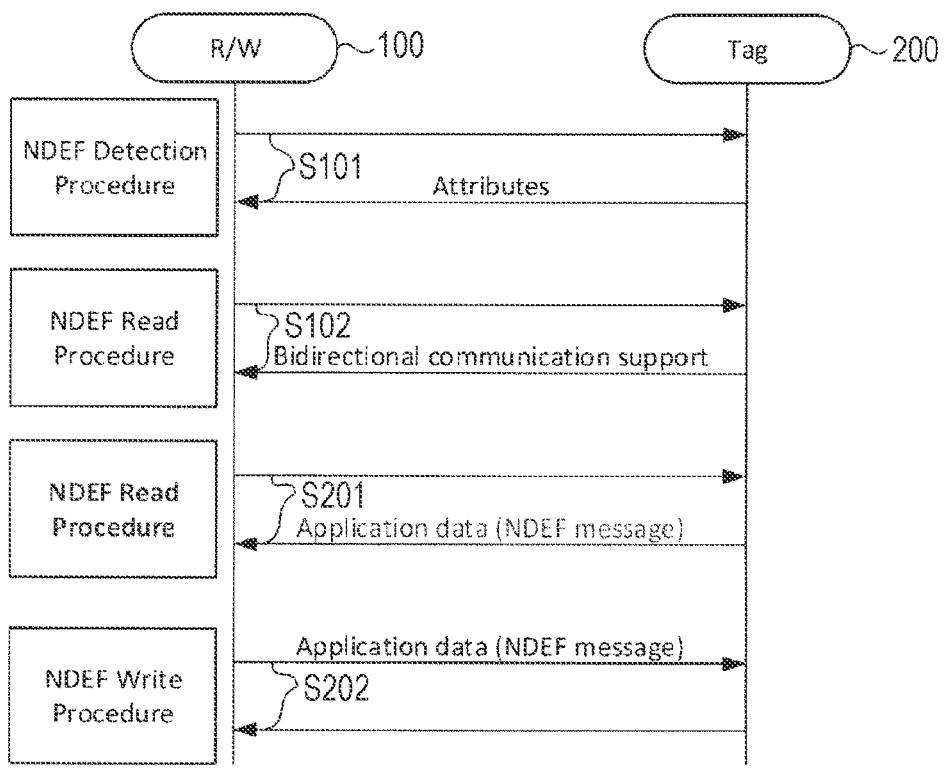

FIG. 6

| NDEF message |||||||
|---|---|---|---|---|---|---|
| $R_1$ MB=1 | ... | $R_r$ | ... | $R_s$ | ... | $R_t$ ME=1 |

FIG. 7

| Name | Length | Description |
|---|---|---|
| NDEF Record Header | 1 byte | HEADER |
| TYPE LENGTH | 1 byte | LENGTH OF TYPE FIELD (TL) |
| PAYLOAD LENGTH | 1 or 4 bytes | LENGTH OF PAYLOAD FIELD (PL) |
| ID LENGTH | 0 or 1 byte | LENGTH OF ID FIELD (IL) |
| TYPE | TL bytes | DATA FORMAT OF DATA STORED IN PAYLOAD<br><br>IN CASE WHERE TNF IS NFC Forum Well Known Type, RECORD TYPE IDENTIFIER INDICATING RECORD FORMAT SPECIFIED BY NFC Forum IS STORED IN TYPE. |
| ID | IL bytes | INFORMATION FOR IDENTIFYING THIS NDEF RECORD |
| PAYLOAD | PL bytes | STORED IN DATA FORMAT SPECIFIED IN TYPE. |

FIG. 8

| b8 | b7 | b6 | b5 | b4 | b3 | b2 | b1 | Description |
|---|---|---|---|---|---|---|---|---|
| X | | | | | | | | MB; Message Begin<br>1 = BEGINNING RECORD OF NDEF MESSAGE |
| | X | | | | | | | ME; Message End<br>1 = END RECORD OF NDEF MESSAGE |
| | | X | | | | | | CF; Chunk Flag<br>INDICATING THAT NDEF RECORD IS DIVIDED. |
| | | | X | | | | | SR; Short Record<br>1 = PAYLOAD LENGTH FIELD IS ONE BYTE |
| | | | | X | | | | IL; ID Length present<br>1 = ID LENGTH FIELD IS ONE BYTE |
| | | | | | X | X | X | TNF; Type Name Format<br>1=NFC Forum Well Known Type |

FIG. 9

| TYPE | "BDPR" | | |
|---|---|---|---|
| PAYLOAD | Name | Length | Description |
| | BI-DIR Mode | 1 byte | NDEF BIDIRECTIONAL COMMUNICATION MODE |
| | OTHER PARAMETERS | | |

FIG. 10

| b8 | b7 | b6 | b5 | b4 | b3 | b2 | b1 | Description |
|---|---|---|---|---|---|---|---|---|
| X | X | X | X | X | X | | | RFU (RESERVED FOR FUTURE USE) |
| | | | | | | X | | INITIAL TRANSMISSION ENTITY<br>INDICATING WHETHER TAG IS INTENDED TO TRANSMIT DATA FIRST.<br>0 = R/W TRANSMITS DATA FIRST<br>1 = TAG TRANSMITS DATA FIRST |
| | | | | | | | X | NDEF BIDIRECTIONAL COMMUNICATION SUPPORT<br>INDICATING WHETHER TAG SUPPORTS NDEF BIDIRECTIONAL COMMUNICATION<br>0 = NOT SUPPORTING<br>1 = SUPPORTING |

FIG. 11

| # | R/W | Tag |
|---|---|---|
| 1 | EXECUTES NDEF DETECTION PROCEDURE. | |
| 2 | | TRANSMITS Attributes (WHETHER NDEF CAN BE STORED, MEMORY SIZE, NDEF DATA SIZE). |
| 3 | EXECUTES NDEF READ PROCEDURE. | |
| 4 | | TRANSMITS NDEF MESSAGE INCLUDING BI-DIR Parameters RECORD.<br><br>SETS NDEF BIDIRECTIONAL COMMUNICATION SUPPORT (b1 OF BI-DIR Mode) AND INITIAL TRANSMISSION ENTITY (b2 OF BI-DIR Mode) IN BI-DIR Parameters RECORD.<br><br>A PLURALITY OF BI-DIR Parameters RECORDS MAY BE SET. |
| 5 | CHECKS CONTENT OF BI-DIR Parameters RECORD INCLUDED IN NDEF MESSAGE. | |
| 6 | CHECKS b1 OF BI-DIR Mode OF BI-DIR Parameters RECORD. | |
| 7 | IN CASE WHERE b1 = 0, BECAUSE NDEF BIDIRECTIONAL COMMUNICATION IS NOT SUPPORTED, PROCESSING MAY BE PERFORMED BY CHECKING ANOTHER RECORD IN SAME NDEF MESSAGE.<br><br>IN CASE WHERE b1 = 1, BECAUSE NDEF BIDIRECTIONAL COMMUNICATION IS SUPPORTED, b2 OF BI-DIR Mode OF BI-DIR Parameters RECORD IS CHECKED. | |
| 8 | IN CASE WHERE b2 = 1, BECAUSE TAG IS INTENDED TO PERFORM INITIAL TRANSMISSION, NDEF READ PROCEDURE IS EXECUTED.<br><br>IN CASE WHERE b2 = 0, NDEF WRITE PROCEDURE IS EXECUTED. | |

| TYPE | "mimes" | | |
|---|---|---|---|
| PAYLOAD | Name | Length | Description |
| | Number of messages (NOM) | 1 byte | NUMBER OF ADDITIONAL NDEF MESSAGES HELD<br>(0=RFU) |
| | Minimum waiting time for next NDEF Read procedure (MWT_READ) | 2 byte | MINIMUM WAITING TIME REQUIRED BEFORE READING NEXT NDEF MESSAGE<br>1-32767 ms<br>0=RFU<br>TIME REQUIRED FOR TAG TO BE ABLE TO PREPARE NEXT NDEF MESSAGE IN TAG MEMORY |

FIG. 15

| # | R/W | Tag |
|---|---|---|
| 1 | EXECUTES NDEF DETECTION PROCEDURE. | |
| 2 | | TRANSMITS Attributes (WHETHER NDEF CAN BE STORED, MEMORY SIZE, NDEF DATA SIZE). |
| 3 | EXECUTES NDEF READ PROCEDURE. | |
| 4 | | TRANSMITS NDEF MESSAGE INCLUDING BI-DIR Parameters RECORD. SET NDEF BIDIRECTIONAL COMMUNICATION SUPPORT (b1 OF BI-DIR Mode) AND INITIAL TRANSMISSION ENTITY (b2 OF BI-DIR Mode) IN BI-DIR Parameters RECORD. |
| 5 | CHECKS CONTENT OF BI-DIR Parameters RECORD INCLUDED IN NDEF MESSAGE. | |
| 6 | CHECKS b1 OF BI-DIR Mode OF BI-DIR Parameters RECORD. | |
| 7 | IN CASE WHERE b1 = 0, BECAUSE NDEF BIDIRECTIONAL COMMUNICATION IS NOT SUPPORTED, Service Name IN BI-DIR Parameters RECORD IS CHECKED AND WHEN THERE IS CORRESPONDING SERVICE, PROCEDURE OF THAT SERVICE IS FOLLOWED. IN CASE WHERE b1 = 1, BECAUSE NDEF BIDIRECTIONAL COMMUNICATION IS SUPPORTED, b2 OF BI-DIR Mode OF BI-DIR Parameters RECORD IS CHECKED. | |
| 9 | EXECUTES NDEF READ PROCEDURE. | |
| 10 | | TRANSMITS NDEF MESSAGE INCLUDING APPLICATION DATA AND Tag-MM RECORD. SETS NUMBER OF ADDITIONAL NDEF MESSAGES (NOM) HELD AND WAITING TIME (MWT_READ) REQUIRED BEFORE EXECUTING NDEF READ PROCEDURE IN Tag-MM RECORD. |
| 11 | CHECKS CONTENT OF Tag-MM RECORD IN ADDITION TO APPLICATION DATA. | |
| 12 | CHECKS Number of messages (NOM) OF Tag-MM RECORD. IN CASE WHERE Tag-MM RECORD IS NOT PRESENT, DATA IS SENT BY R/W IN NDEF WRITE PROCEDURE OR APPLICATION IS ENDED. | |
| 13 | IN CASE WHERE NOM >=1, BECAUSE TAG HAS ADDITIONAL MESSAGE, WAITING FOR MWT_READ IS PERFORMED AND NDEF READ PROCEDURE IS EXECUTED. IN CASE WHERE b1 = 0, TAG DOES NOT HAVE SUBSEQUENT DATA. DATA IS SENT BY R/W IN NDEF WRITE PROCEDURE OR APPLICATION IS ENDED. | |
| 14 | | TAG HOST IS NOTIFIED OF READ COMPLETION. IN CASE WHERE THERE IS NEXT NDEF MESSAGE TO BE SENT, NDEF MESSAGE INCLUDING APPLICATION DATA AND Tag-MM RECORD IS TRANSMITTED. |

COMMUNICATION APPARATUS AND COMMUNICATION METHOD

CROSS REFERENCE TO PRIOR APPLICATION

This application is a National Stage Patent Application of PCT International Patent Application No. PCT/JP2019/047747 (filed on Dec. 6, 2019) under 35 U.S.C. § 371, which claims priority to Japanese Patent Application No. 2018-247351 (filed on Dec. 28, 2018), which are all hereby incorporated by reference in their entirety.

TECHNICAL FIELD

The present disclosure relates to a communication apparatus and a communication method.

BACKGROUND ART

Conventionally, a reader/writer and a tag that use near field communication (NFC) technology are known as one of non-contact communications. In a case where NFC communication is performed, data exchange is realized by constantly sending a command for the reader/writer to read or write with respect to the tag. A plurality of types of reader/writers and tags is defined, and the commands, protocols, and memory formats inside the tags are different. Therefore, the NFC Forum specifies NFC data exchange format (NDEF) as a data format that can be commonly used by these different types.

Moreover, the NFC Forum specifies a sequence for detecting NDEF data and reading or writing with respect to NDEF data. For example, common procedures for accessing the memory of a tag called NDEF detection procedure, NDEF read procedure, and NDEF write procedure are specified. The data exchanged in these common procedures is called an NDEF message. In this way, by specifying common procedures, the reader/writer and the tag can communicate even in a case where the types are different. Regarding these matters, refer to, for example, Non-Patent Documents 1 to 4 below.

CITATION LIST

Non-Patent Document

Non-Patent Document 1: NFC Forum Type 2 Tag Technical Specification
Non-Patent Document 2: NFC Forum Type 3 Tag Technical Specification
Non-Patent Document 3: NFC Forum Type 4 Tag Technical Specification
Non-Patent Document 4: NFC Forum Type 5 Tag Technical Specification

SUMMARY OF THE INVENTION

Problems to be Solved by the Invention

However, in the communication using the reader/writer and the tag using the NDEF message, the reader/writer always determines whether to perform the read procedure or the write procedure with respect to the tag. That is, which one sends the data first depends on an application on the reader/writer side. Therefore, it has been difficult for an application of the tag to voluntarily send data because the data flow is controlled by the reader/writer.

As described above, in the case of non-contact communication, there have been cases where one of communication apparatuses controls the communication of the other and the other cannot voluntarily control the communication.

Therefore, the present disclosure proposes a mechanism in which a communication apparatus that performs non-contact communication can control communication.

Solutions to Problems

According to the present disclosure, a communication apparatus is provided. The communication apparatus is a communication apparatus that performs non-contact communication with an external apparatus via a memory of the external apparatus. The communication apparatus includes a control unit. The control unit receives a message including a parameter related to the control of the non-contact communication. The control unit performs the non-contact communication with the external apparatus on the basis of the parameter.

BRIEF DESCRIPTION OF DRAWINGS

FIG. 3 is a diagram for explaining an outline of NDEF bidirectional communication processing according to a first embodiment of the present disclosure.

FIG. 4 is a diagram for explaining an outline of NDEF bidirectional communication processing according to the first embodiment of the present disclosure.

FIG. 6 is a diagram showing a configuration example of an NDEF message.

FIG. 7 is a diagram showing a configuration example of an NDEF record.

FIG. 8 is a diagram showing a configuration example of a header of an NDEF record.

FIG. 9 is a diagram for explaining a configuration example of a BI-DIR Parameters record according to the first embodiment of the present disclosure.

FIG. 10 is a diagram for explaining an example of BI-DIR Mode according to the first embodiment of the present disclosure.

FIG. 11 is a table for explaining a flow of communication processing according to the first embodiment of the present disclosure.

FIG. 15 is a table for explaining a flow of communication processing according to the second embodiment of the present disclosure.

MODE FOR CARRYING OUT THE INVENTION

Figure 1:
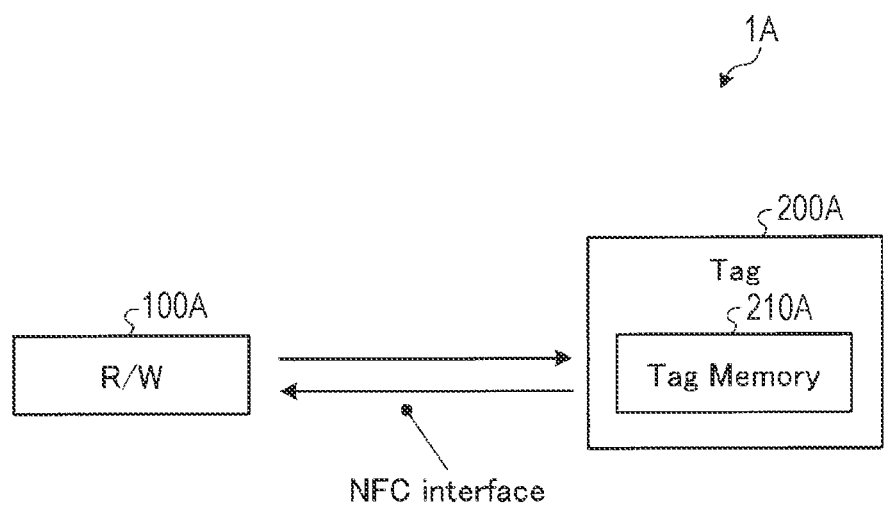
FIG. 1 is a diagram showing a configuration example of a communication system that performs NFC.

A preferred embodiment of the present disclosure will be described in detail below with reference to the accompanying drawings. Note that, in the present specification and the drawings, configuration elements that have substantially the same function and configuration are denoted with the same reference numerals, and repeated description is omitted.

Note that the description is given in the order below.
1. Introduction
1.1. About NFC
1.2. Connection Handover
2. First embodiment
2.1. Outline of the first embodiment
2.2. Configuration example of the communication system
2.3. Configuration example of the NDEF message
2.4. Communication processing according to the first embodiment
3. Second embodiment
3.1. Configuration example of the NDEF message
3.2. Communication processing according to the second embodiment
4. Application example
5. Other embodiments
6. Supplement

1. Introduction

1.1. About NFC

The outline of NFC will be described below as an example of non-contact communication. Here, a case where the communication apparatus performs communication on the basis of NDEF, which is an NFC standard, will be described. FIG. 1 is a diagram showing a configuration example of a communication system that performs NFC.

As shown in FIG. 1, a communication system 1A includes a reader/writer (R/W) 100A and a tag (Tag) 200A as communication apparatuses that perform communication using NFC. The reader/writer 100A and the tag 200A are connected to each other via an NFC interface.

More specifically, the tag 200A includes, for example, a tag memory 210A, which is a non-volatile memory. The reader/writer 100A communicates with the tag 200A by executing the NDEF write procedure for writing an NDEF message to the tag memory 210A and the NDEF read procedure for reading an NDEF message from the tag memory 210A. As a procedure (Procedure) performed by the reader/writer 100A, there is an NDEF detection procedure in addition to the NDEF write procedure and the NDEF read procedure.

Figure 2:
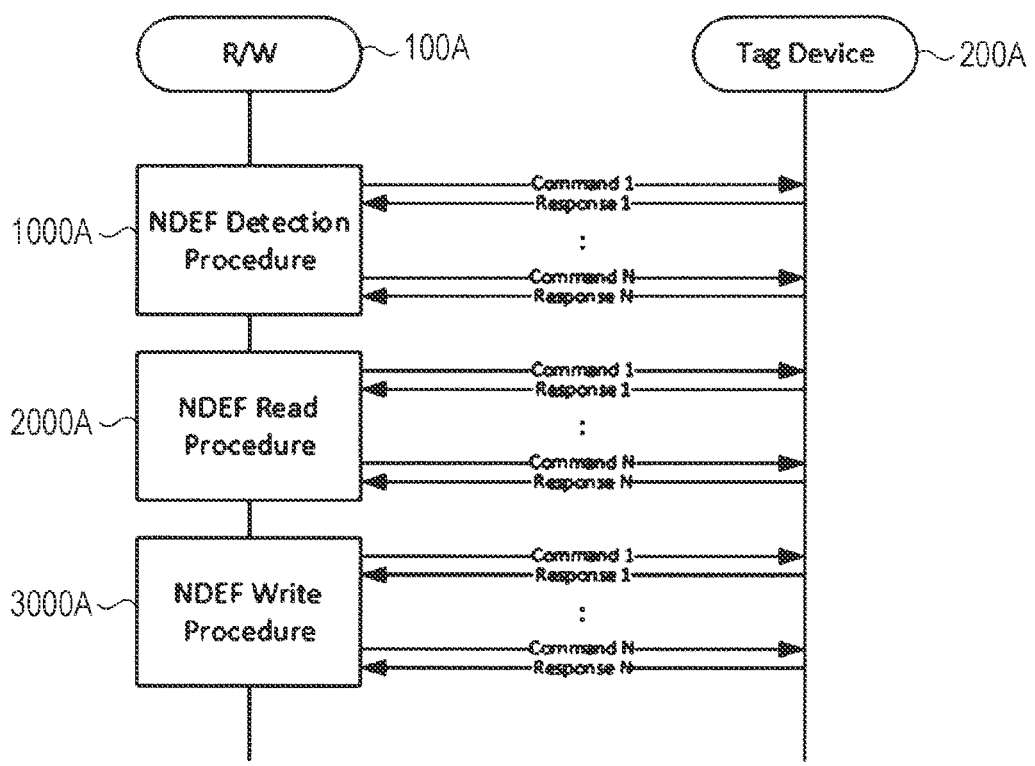
FIG. 2 is a diagram for explaining each procedure in a communication system.

FIG. 2 is a diagram for explaining each procedure in the communication system 1A. In the example shown in FIG. 2, the reader/writer 100A first executes an NDEF detection procedure (NDEF Detection Procedure) 1000A. By executing the NDEF detection procedure 1000A, the reader/writer 100A detects, for example, whether or not the tag 200A (denoted as Tag Device in FIG. 2) can perform NDEF-compliant communication. The reader/writer 100A detects, for example, whether or not the tag 200A can perform NDEF-compliant communication by transmitting a command and receiving the response. In a case where the tag 200A can perform NDEF-compliant communication, the reader/writer 100A performs communication using the tag 200A and NFC by executing an NDEF read procedure 2000A or an NDEF write procedure 3000A.

Subsequently, the reader/writer 100A executes the NDEF read procedure 2000A. The reader/writer 100A, for example, transmits a command and receives the response to read the NDEF message held in the tag memory 210A.

Next, the reader/writer 100A executes the NDEF write procedure 3000A. The reader/writer 100A, for example, transmits a command and receives the response to write the NDEF message to the tag memory 210A.

Here, the execution of the reader/writer 100A starts with the NDEF read procedure 2000A, but the order of execution of the NDEF read procedure 2000A and the NDEF write procedure 3000A is not limited to the example of FIG. 2. The reader/writer 100A may perform the NDEF write procedure 3000A and then execute the NDEF read procedure 2000A. In NDEF, after executing the NDEF detection procedure 1000A, the reader/writer 100A determines which procedure, read or write, the reader/writer 100A executes.

In this way, in the conventional NFC, the reader/writer 100A performs communication by writing an NDEF message to the tag memory 210A of the tag 200A or reading an NDEF message from the tag memory 210A. In other words, in the conventional NFC, the reader/writer 100A mainly controls the communication, and the tag 200A cannot actively send data.

1.2. Connection Handover

Here, in recent years, a technology called connection handover (Connection Handover) has been used. Here, the connection handover technology is a technology that performs communication by automatically switching a plurality of communication means corresponding to mutually different communication methods. In a device using the handover technology, for example, the authentication information of a second communication method is transmitted using the communication path of a first communication method, and the authentication setting of the second communication method is automatically performed using the authentication information.

For example, it is assumed that Bluetooth (registered trademark) pairing setting between devices such as a speaker and a smartphone is performed using NFC. In this case, by bringing the smartphone closer to the speaker, for example, the reader/writer 100A mounted on the smartphone reads the identification information held by the tag memory 210A of the tag 200A mounted on the speaker. The smartphone pairs with the speaker on the basis of the read identification information and establishes a Bluetooth connection.

In such connection handover technology, for example, the tag 200A is required to actively send a message in order to perform more secure authentication. For example, it is conceivable that different authentication information is transmitted to the reader/writer 100A each time the tag 200A performs authentication so that more secure authentication can be performed between the device including the reader/writer 100A and the device including the tag 200A. Alternatively, for example, in a case where communication can be performed by a plurality of communication means such as wireless LAN other than the above-mentioned NFC and Bluetooth, it is conceivable to enable the device including the tag 200A to specify to which communication means a handover is performed. In this way, a mechanism is required in which the tag 200A (communication apparatus) that performs NFC (non-contact communication) can actively transmit a message to the reader/writer 100A, in other words, can control non-proximity communication.

Here, a communication mode in which the tag 200A side can actively transmit an NDEF message is described as NDEF bidirectional communication. Furthermore, a communication mode in which the reader/writer 100A performs control to read or write with respect to the tag 200A is also described as simply bidirectional communication to distinguish it from the NDEF bidirectional communication in which the tag 200A actively performs communication.

The mechanism for realizing the NDEF bidirectional communication will be described below.

2. First Embodiment

2.1. Outline of the First Embodiment

FIGS. 3 and 4 are diagrams for explaining an outline of NDEF bidirectional communication processing according to the first embodiment of the present disclosure. The communication processing according to the first embodiment of the present disclosure is executed by a communication system 1 (see FIG. 5) including a reader/writer 100 and a tag 200.

As shown in FIG. 3, the reader/writer 100 first executes the NDEF detection procedure to acquire Attributes from the tag 200 (step S101). The Attributes include information regarding the tag 200, such as whether or not the tag 200 supports NDEF, the memory size of the tag memory 210 (see FIG. 5), and the like.

Next, the reader/writer 100 executes the NDEF read procedure to acquire Bidirectional communication support (step S102). The Bidirectional communication support is an NDEF message including information regarding the tag 200, such as whether or not the tag 200 supports the NDEF bidirectional communication, and the like.

Furthermore, the Bidirectional communication support includes, for example, parameters related to control of non-contact communication (here, NFC) (hereinafter, also referred to as communication control parameters). The communication control parameter is a parameter that designates which procedure, the NDEF read procedure or the NDEF write procedure, to start from, for example, for the communication after the connection between the reader/writer 100 and the tag 200 is established. The reader/writer 100 establishes the connection with the tag 200 by reading the Bidirectional communication support. Note that the Bidirectional communication support will be described later with reference to FIG. 9.

The reader/writer 100 starts communication with the tag 200 by executing either the NDEF read procedure or the NDEF write procedure according to the communication control parameter. In the example of FIG. 3, the reader/writer 100 executes the NDEF write procedure and transmits an NDEF message including application data to the tag 200 (step S103). Subsequently, the reader/writer 100 executes the NDEF read procedure and receives the NDEF message including the application data from the tag 200 (step S104).

Note that the tag 200 can also instruct the reader/writer 100 to start communication with the NDEF reading procedure by using the communication control parameter. In this case, as shown in FIG. 4, the reader/writer 100 starts communication with the tag 200 by executing the NDEF read procedure after receiving the Bidirectional communication support and by receiving the NDEF message including the application data from the tag 200 (step S201). Subsequently, the reader/writer 100 executes the NDEF write procedure and transmits the NDEF message including the application data to the tag 200 (step S202).

In this way, the tag 200 transmits a message including a parameter related to the control of non-contact communication, and the reader/writer 100 executes non-contact communication according to such parameter. Specifically, the tag 200 transmits to the reader/writer 100 the NFC NDEF message including the communication control parameter that indicates from which procedure, the NDEF read procedure or the NDEF write procedure, the reader/writer 100 starts the communication. The reader/writer 100 starts the communication from either the NDEF read procedure or the NDEF write procedure according to the instruction of the communication control parameter.

Therefore, the tag 200 can actively transmit data to the reader/writer 100, and the tag 200 can control the non-contact communication.

2.2. Configuration Example of the Communication System

Figure 5:
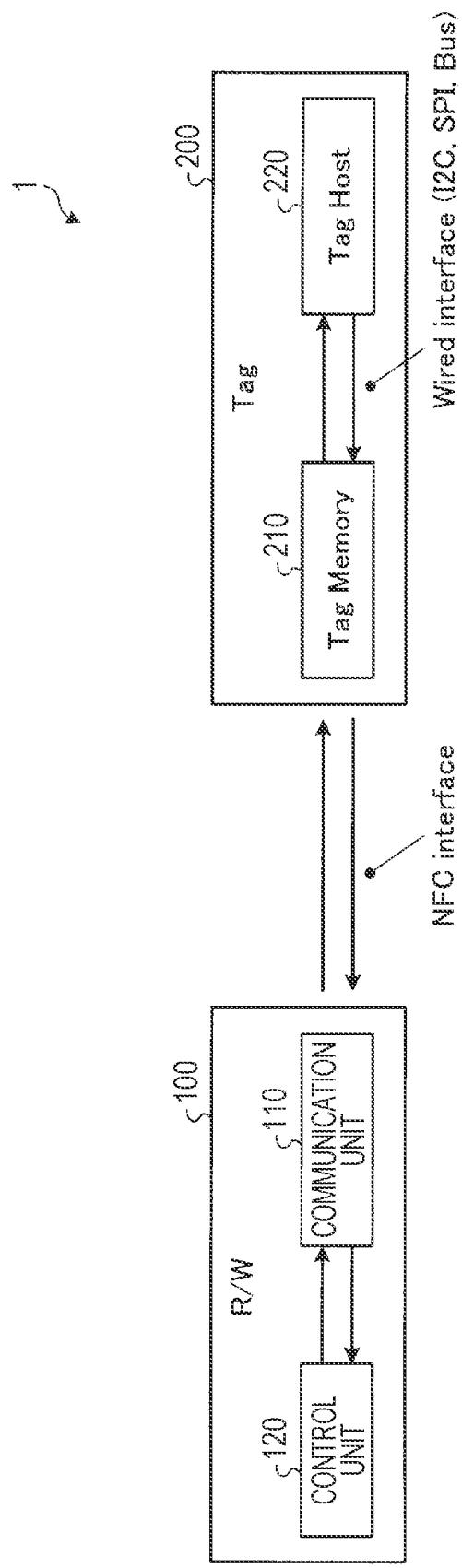
FIG. 5 is a diagram showing a configuration example of a communication system according to the first embodiment of the present disclosure.

FIG. 5 is a diagram showing a configuration example of the communication system 1 according to the first embodiment of the present disclosure. As shown in FIG. 5, the communication system 1 includes the reader/writer 100 and the tag 200.

The reader/writer 100 is a communication apparatus that communicates with the tag 200 on the basis of, for example, NDEF. The reader/writer 100 includes a communication unit 110 and a control unit 120. The communication unit 110 communicates with a tag memory 210 of the tag 200 using NFC via, for example, an antenna (not shown). The control unit 120 controls the reader/writer 100. The control unit 120 executes, for example, the NDEF write procedure for writing an NDEF message to the tag memory 210. Furthermore, the control unit 120 executes the NDEF read procedure for reading an NDEF message from the tag memory 210. The control unit 120 executes the NDEF detection procedure for detecting the tag 200.

The tag 200 includes the tag memory 210 (Tag Memory) and a tag host 220 (Tag Host).

The tag memory 210 is, for example, a non-volatile memory and holds data inside. The tag memory 210 communicates with the reader/writer 100 via, for example, an antenna (not shown). The tag memory 210 may include a processor for writing and reading data according to instructions from, for example, the reader/writer 100 or the tag host 220.

The tag host 220 includes, for example, a processor including a micro processing unit (MPU) or various processing circuits. The tag host 220 accesses the tag memory 210 to read the data held by the tag memory 210 or write the data to the tag memory 210. The tag host 220 communicates with the reader/writer 100 via the tag memory 210.

The reader/writer 100 and the tag 200 are connected by, for example, an NFC interface. Furthermore, the tag memory 210 and the tag host 220 are connected by a wired interface such as I2C, SPI, or Bus.

2.3. Configuration Example of the NDEF Message

Next, the NDEF message exchanged between the reader/writer 100 and the tag 200 be described. FIG. 6 is a diagram showing a configuration example of an NDEF message.

As shown in FIG. 6, the NDEF message includes one or more NDEF records. The NDEF record includes a parameter MB and a parameter ME. The parameter MB and the parameter ME are parameters indicating in which part (start, end, middle) of the NDEF message the NDEF record is present. For example, an NDEF record $R_1$ having the parameter MB of 1 located at the start of the NDEF message. Furthermore, an NDEF record $R_t$ having the parameter ME of 1 is located at the end of the NDEF message. Furthermore, other NDEF records $R_r$ and $R_s$ are located in the middle of the NDEF message. Note that the configuration of the NDEF message shown in FIG. 6 is an example, and a configuration other than that shown in FIG. 6 may be possible.

Next, FIG. 7 is a diagram showing a configuration example of an NDEF record. As shown in FIG. 7, the NDEF record includes a header and an ID field indicating information for identifying the NDEF record. Furthermore, the NDEF record includes a TYPE field indicating the data format of data stored in a PAYLOAD field, the PAYLOAD field in which the data is stored in the format specified by TYPE, and the like. Note that in a case where type name format (TNF) is NFC Forum Well Known Type, a record type identifier indicating the record format specified by NFC Forum is stored in the TYPE field.

Furthermore, the NDEF record includes TYPE LENGTH (TL) indicating the length of the TYPE field, ID LENGTH (IL) indicating the length of the ID field, PAYLOAD LENGTH (PL) indicating the length of the PAYLOAD field, and the like. Note that the configuration example of the NDEF record shown in FIG. 7 is an example, and a configuration other than that shown in FIG. 7 may be possible.

FIG. 8 is a diagram showing a configuration example of the header of the NDEF record. As shown in FIG. 8, the header of the NDEF record includes a parameter MB and a parameter ME. In addition, the header of the NDEF record includes a parameter and the like indicating whether or not the NDEF record is divided. Note that the configuration of the NDEF record and the value of each parameter are specified in NFC Forum NFC Data Exchange Format (NDEF) Technical Specification.

The tag 200 transmits the NDEF message including the communication control parameter for controlling communication with the reader/writer 100 as described above. The communication control parameter according to the present embodiment is a parameter for determining the order of sending the NDEF message. That is, the communication control parameter is a parameter that specifies which to execute, the NDEF read procedure or the NDEF write procedure, for the reader/writer 100 to start the communication after the connection is established. The communication control parameter according to the present embodiment is also referred to as an initial transmission entity below.

Furthermore, the NDEF record including the initial transmission entity includes, for example, a parameter indicating whether or not the tag 200 supports the NDEF bidirectional communication (hereinafter, also referred to as a communication support parameter). The NDEF record including the initial transmission entity and the communication support parameter is also referred to as a BI-DIR Parameters record.

The NDEF message including a BI-DIR Parameters record is transmitted from the tag 200 to the reader/writer 100 in the NDEF read procedure following the NDEF detection procedure. The NDEF message including such BI-DIR Parameters record corresponds to, for example, the Bidirectional communication support described with reference to FIGS. 3 and 4.

FIG. 9 is a diagram for explaining a configuration example of the BI-DIR Parameters record according to the first embodiment of the present disclosure.

As shown in FIG. 9, in the BI-DIR Parameters record, "BDPR" is set in the TYPE field. Therefore, the fact that the PAYLOAD field of the BI-DIR Parameters record includes the initial transmission entity and the communication support parameter is indicated. Furthermore, an NDEF bidirectional communication mode is specified in the BI-DIR Mode included in the PAYLOAD field of the BI-DIR Parameters record.

FIG. 10 is a diagram for explaining an example of the BI-DIR Mode according to the first embodiment of the present disclosure. As shown in FIG. 10, the BI-DIR Mode includes parameters b8 to b1. The parameters b8 to b3 are reserved, for example, for future use. Furthermore, b2 is a parameter, which is an initial transmission entity indicating whether the tag 200 is intended to transmit the data (NDEF message) first. For example, in a case where b2 is 0, it indicates that the reader/writer 100 transmits the data first, that is, the reader/writer 100 starts communication from the NDEF write procedure. Furthermore, in a case where b2 is 1, it indicates that the tag 200 transmits the data first, that is, the reader/writer 100 starts communication from the NDEF read procedure.

Furthermore, b1 is a communication support parameter indicating whether or not the tag 200 supports the NDEF bidirectional communication. For example, in a case where b1 is 0, it indicates that the tag 200 does not support the NDEF bidirectional communication. Furthermore, in a case where b1 is 1, it indicates that the tag 200 supports the NDEF bidirectional communication.

As shown in FIG. 1, the tag includes the tag 200A including the tag memory 210A but not the tag host 220, and the tag 200 including the tag host 220 in addition to the tag memory 210. Since the tag 200A that does not include the tag host 220 cannot realize the NDEF bidirectional communication, the above-mentioned communication support parameter b1 becomes 0.

2.4. Communication Processing According to the First Embodiment

FIG. 11 is a table for explaining a flow of communication processing according to the first embodiment of the present disclosure. In the table shown in FIG. 11, the left column shows the processing order, the center column shows the processing by the reader/writer 100, and the right column shows the processing by the tag 200.

The communication processing shown in FIG. 11 is executed in a case where the reader/writer 100 and the tag 200 communicate with each other. More specifically, the communication processing shown in FIG. 11 is executed in a case where a predetermined application is started or in a case where the reader/writer 100 is brought closer to the tag 200 by the user and the reader/writer 100 and the tag 200 enter a mutual communication range.

As shown in FIG. 11, the reader/writer 100 executes the NDEF detection procedure (#1). Next, the tag 200 transmits Attributes according to the NDEF detection procedure (#2). The Attributes include information regarding the tag 200, such as whether the NDEF message is stored in the tag memory 210, the memory size of the tag memory 210, the size of the NDEF data including the NDEF message stored in the tag memory 210, and the like.

The reader/writer 100 that has received the Attributes executes the NDEF read procedure (#3). The tag 200 transmits the NDEF message including the BI-DIR Parameters record to the reader/writer 100 according to such read procedure (#4). The tag 200 sets both the communication support parameter (b1 of FIG. 10) indicating whether or not the NDEF bidirectional communication is supported and the initial transmission entity (b2 of FIG. 10) in the BI-DIR Parameters record. More specifically, the tag 200 sets the communication support parameter b1 to 1 in a case where the NDEF bidirectional communication with the reader/writer 100 is performed, and sets b1 to 0 in a case where the NDEF bidirectional communication is not performed. Furthermore, the tag 200 sets the initial transmission entity b2 to 1 in a case where the transmission is performed for the communication with the reader/writer 100, and sets b2 to 0 in a case where the reception is performed.

Note that the tag 200 may set a plurality of BI-DIR Parameters records. For example, the tag 200 may include a plurality of BI-DIR Parameters records in a single NDEF message and transmit it to the reader/writer 100. Reliability can be improved, for example, when the tag 200 transmits the NDEF message including a plurality of identical BI-DIR Parameters records.

The reader/writer 100 that has received the NDEF message including the BI-DIR Parameters record checks the content of the BI-DIR Parameters record (#5).

First, the reader/writer 100 checks b1 of the BI-DIR Mode in the BI-DIR Parameters record (#6).

In a case where b1=0, the tag 200 does not support the NDEF bidirectional communication, and therefore the reader/writer 100 may check another NDEF record in the NDEF message acquired in #4 and perform processing according to the data of the NDEF record. On the other hand, in a case where b1=1, the tag 200 supports the NDEF bidirectional communication, and b2 of the BI-DIR Mode in the BI-DIR Parameters record is checked (#7).

In a case where b2=1, the tag 200 is intended to perform transmission (initial transmission) at the beginning of communication, and therefore the reader/writer 100 first executes the NDEF read procedure. On the other hand, in a case where b2=0, the reader/writer 100 first executes the NDEF write procedure (#8).

Subsequently, more detailed communication processing including the processing of the tag memory 210 and the tag host 220 will be described with reference to FIG. 12.

Figure 12:
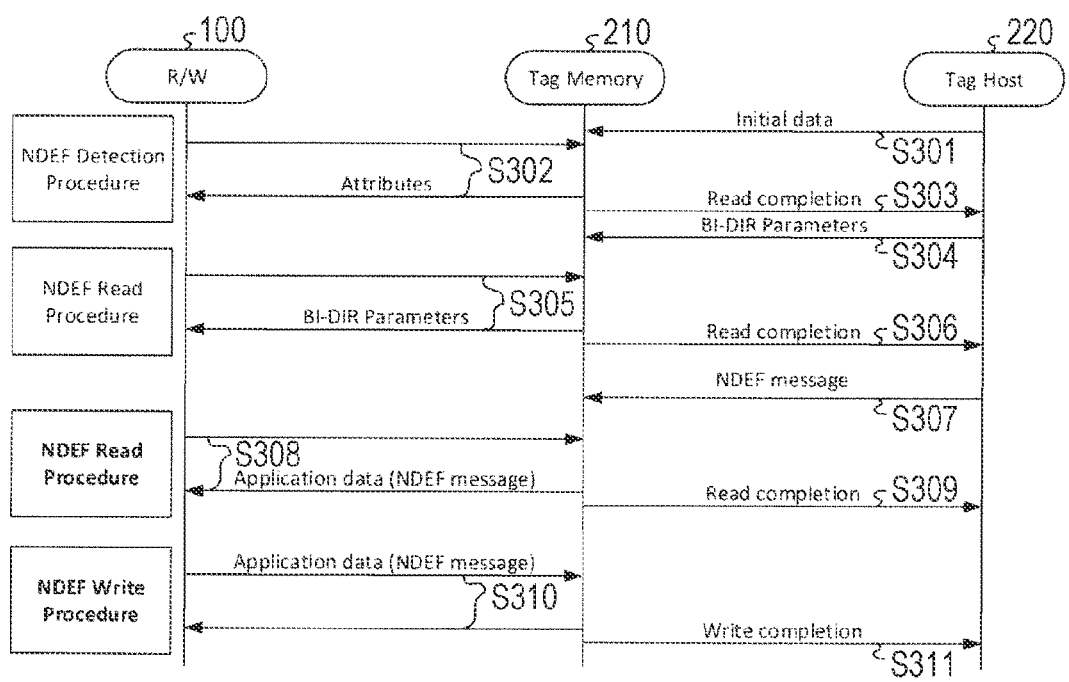
FIG. 12 is a sequence diagram showing a flow of communication processing according to the first embodiment of the present disclosure.

FIG. 12 is a sequence diagram showing a flow of communication processing according to the first embodiment of the present disclosure. Here, it is assumed that the communication after the connection is established starts with the transmission by the tag 200.

As shown in FIG. 12, the tag host 220 of the tag 200 first writes initial data required for communication with the reader/writer 100 into the tag memory 210 (step S301). The tag 200 writes, for example, Attributes to the tag memory 210 as the initial data.

Subsequently, the reader/writer 100 executes the NDEF detection procedure to acquire the Attributes from the tag memory 210 (step S302). When the reading of the Attributes by the reader/writer 100 is completed, the tag memory 210 transmits a read completion notification to the tag host 220 (step S303). The tag host 220 that has acquired the notification writes the NDEF message including the BI-DIR Parameters record to the tag memory 210 (step S304). The BI-DIR Parameters record includes the communication support parameter (b1 of FIG. 10) indicating that the tag 200 supports the NDEF bidirectional communication and the initial transmission entity (b2 of FIG. 10) indicating that the tag 200 starts the communication from the transmission.

The reader/writer 100 executes the NDEF read procedure and acquires the NDEF message including the BI-DIR Parameters record from the tag memory 210 (step S305). When the reading of the NDEF message by the reader/writer 100 is completed, the tag memory 210 transmits a read completion notification to the tag host 220 (step S306). Therefore, the connection between the reader/writer 100 and the tag 200 is established. The tag host 220 that has acquired the notification writes the NDEF message including the application data to the tag memory 210 (step S307).

The reader/writer 100 checks the communication support parameter and the initial transmission entity in the BI-DIR Parameters record, executes the NDEF read procedure, and acquires the application data included in the NDEF message (step S308). When the reading of the NDEF message by the reader/writer 100 is completed, the tag memory 210 transmits a read completion notification to the tag host 220 (step S309).

The reader/writer 100 writes the NDEF message including the application data to the tag memory 210 (step S310). When the writing of the NDEF message by the reader/writer 100 is completed, the tag memory 210 transmits a write completion notification to the tag host 220 (step S311).

As described above, the reader/writer 100 (an example of the communication apparatus) performs non-contact communication with the tag 200 via the tag memory 210 (an example of the memory) of the tag 200 (an example of the external apparatus). The control unit 120 of the reader/writer 100 receives a message including a parameter related to the control of NFC (an example of the non-contact communication). The reader/writer 100 performs the non-contact communication with the tag 200 on the basis of the parameter.

Furthermore, the control unit 120 of the reader/writer 100 executes writing to the tag memory 210 or reading from the tag memory 210 on the basis of the initial transmission entity (an example of a parameter related to control of non-contact communication).

Furthermore, the tag 200 includes the tag memory 210 (an example of the memory) and performs communication (an example of the non-contact communication) using NFC with the reader/writer 100 (an example of the external apparatus) via the tag memory 210. The tag host 220 (an example of the control unit) generates parameters for controlling the reader/writer 100 in a case where the non-contact communication is performed. The tag host 220 transmits the NDEF message (an example of the message) including parameters to the reader/writer 100.

Furthermore, the tag 200 generates the initial transmission entity (an example of the parameter) for instructing the reader/writer 100 to execute either writing to the tag memory 210 or reading from the tag memory 210.

Therefore, the tag 200, which is an example of the communication apparatus, can control communication with the reader/writer 100, which is an example of another communication apparatus. The tag 200 can specify to the reader/writer 100, for example, whether to start communication with the reader/writer 100 from transmission (reading) or reception (writing).

3. Second Embodiment

In the first embodiment described above, the case where the tag 200 sets which to start the communication from, transmission or reception, in the initial transmission entity is shown. In addition to the example described above, the tag 200 may be able to continuously transmit the data. Thus, in the second embodiment, the example in which the tag 200 transmits subsequent additional data after the NDEF message is transmitted is transmitted.

As described above, in a case where the data is transmitted from the tag 200 to the reader/writer 100, the reader/writer 100 reads the data from the tag memory 210. Therefore, the size of the data read from the tag memory 210 (the size of the transmission data of the tag 200) depends on the read amount of the reader/writer 100, and cannot arbitrarily be set on the tag 200 side. That is, the tag 200 cannot transmit data larger than the data read by the reader/writer 100 at one time.

Thus, in the second embodiment of the present disclosure, the tag 200 transmits the transmission data including a parameter (additional holding notification) indicating that there is additional data to be subsequently transmitted. Therefore, the reader/writer 100 can subsequently read the additional data after reading the transmission data, and the tag 200 can transmit data of any size to the reader/writer 100.

Specifically, the tag 200 transmits an NDEF message including an additional holding parameter indicating that there is additional data to be subsequently transmitted (hereinafter, also referred to as NDEF additional data or NDEF additional message). Here, the configuration of the NDEF message including the additional holding parameter will be described with reference to FIG. 13.

3.1. Configuration Example of the NDEF Message

Figures 13, 14:
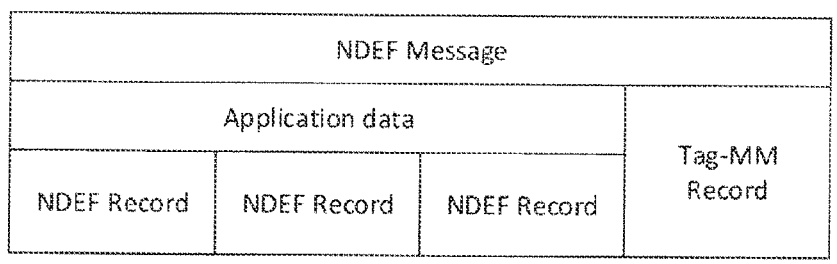
FIG. 13 is a diagram showing a configuration example of an NDEF message according to a second embodiment of the present disclosure.
FIG. 14 is a diagram for explaining a Tag-MM record according to the second embodiment of the present disclosure.

FIG. 13 is a diagram showing a configuration example of the NDEF message according to the second embodiment of the present disclosure. As shown in FIG. 13, the NDEF message includes application data including a plurality of NDEF records and a Tag Multiple Message record (Tag-MM record) including the additional holding parameter.

Next, the Tag-MM record will be described with reference to FIG. 14. FIG. 14 is a diagram for explaining the Tag-MM record according to the second embodiment of the present disclosure.

As shown in FIG. 14, the TYPE of the Tag-MM record is set to "mmes". Furthermore, the PAYLOAD field of the Tag-MM record includes Number of messages (NOM) and Minimum waiting time for next NDEF Read procedure (MWT_READ). The NOM is a parameter indicating the number of NDEF additional messages to be continuously transmitted, in other words, an additional holding parameter indicating whether or not there is additional data to be continuously transmitted. In a case where the NOM is set, it indicates that the tag 200 holds additional data.

The MWT_READ is a parameter indicating the minimum waiting time required before reading the NDEF additional message to be continuously transmitted. In the example of FIG. 14, the tag 200 sets the time as MWT_READ, for example, from 1 ms to 32767 ms.

A predetermined time is required from reading of the NDEF message by the reader/writer 100 to writing of the NDEF additional message to the tag memory 210 by the tag 200. Therefore, the tag 200 sets the time required to finish writing the additional NDEF message in the tag memory 210 as MWT_READ. Thus, the MWT_READ is the time required for the tag 200 to prepare the next NDEF message in the tag memory 210.

3.2. Communication Processing According to the Second Embodiment

Next, the flow of communication processing in the communication system 1 according to the second embodiment of the present disclosure will be described. FIG. 15 is a table for explaining the flow of communication processing according to the second embodiment of the present disclosure. Note that #1 to #7 are the same as those of the communication processing shown in FIG. 11. Furthermore, here, a case where the tag 200 starts the communication from transmission will be described.

As shown in FIG. 15, the reader/writer 100 executes the NDEF read procedure on the basis of b2 (here, b2=1) of the BI-DIR Mode in the BI-DIR Parameters record checked in #7 (#19).

The tag 200 transmits the NDEF message including the application data and the Tag-MM record to the reader/writer 100 according to such read procedure (#10). The tag 200 sets the number of NDEF additional messages (NOM) held and the waiting time (MWT_READ) required before executing the NDEF read procedure in the Tag-MM record.

The reader/writer 100 that has received the NDEF message checks the contents of the application data and the Tag-MM record (#11).

The reader/writer 100 first checks the NOM of the Tag-MM record. In a case where the NOM is absent, the reader/writer 100 transmits the data to the tag 200 in the NDEF write procedure. Alternatively, the reader/writer 100 ends the application that communicates with the tag 200 (#12).

On the other hand, in a case where the NOM is one or more, the reader/writer 100 determines that the tag 200 holds additional data, waits for the waiting time set in the MWT_READ to elapse, and executes the NDEF read procedure. Note that in a case where the NOM is zero, the reader/writer 100 determines that the tag 200 does not hold additional data, and the reader/writer 100 transmits the data to the tag 200 in the NDEF write procedure. Alternatively, the reader/writer 100 ends the application that communicates with the tag 200 (#13).

When the read procedure by the reader/writer 100 is completed, the tag host 220 is notified of the completion of reading. In a case where the tag 200 holds a subsequent NDEF additional message, it returns to #10 and transmits the NDEF message including the application data and the Tag-MM record to the reader/writer 100 (#14).

Figure 16:
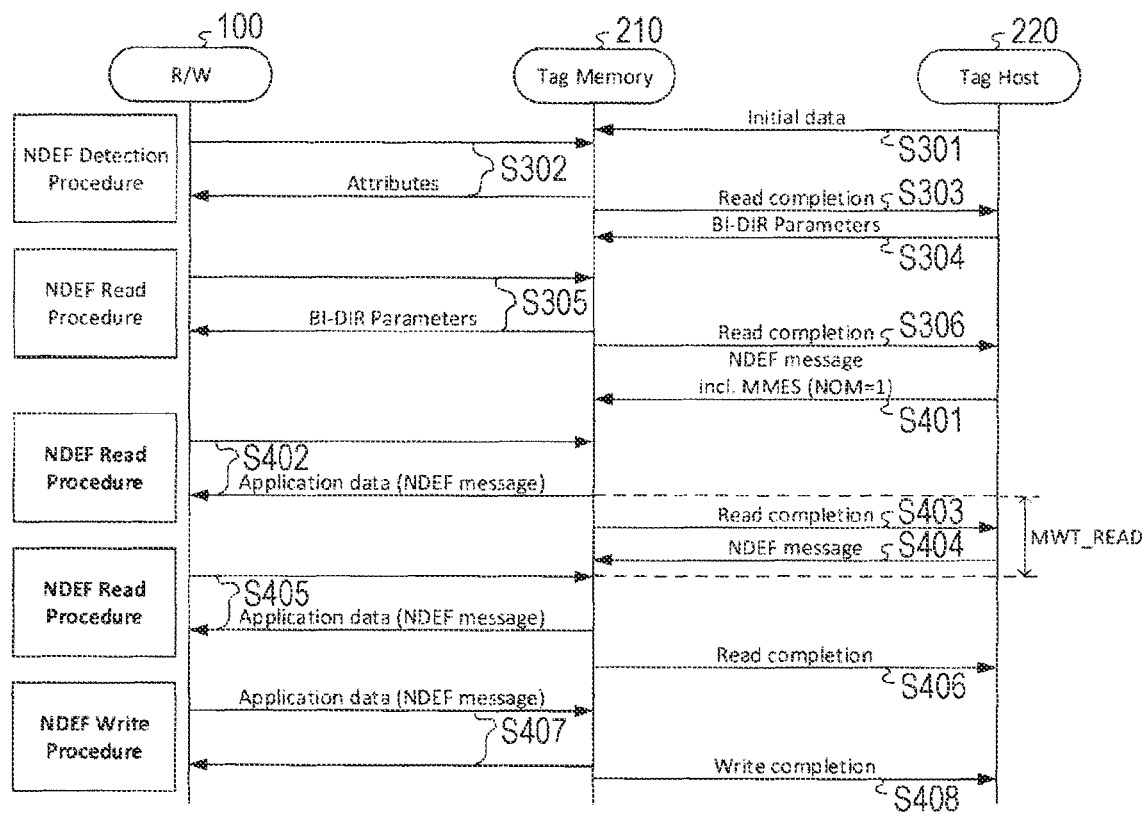
FIG. 16 is a sequence diagram showing a flow of communication processing according to the second embodiment of the present disclosure.

FIG. 16 is a sequence diagram showing the flow of communication processing according to the second embodiment of the present disclosure. Note that the processing up to step S306 is the same flow as the communication processing shown in FIG. 12, and the description will be omitted.

In step S306, the tag host 220 that has received the read completion notification of the NDEF additional message including the BI-DIR Parameters record writes the NDEF message including the Tag-MM record to the tag memory 210 (step S401). Here, it is assumed that the tag host 220 holds one NDEF additional message. That is, it is assumed that the tag host 220 writes the NDEF message including the Tag-MM record with NOM=1 to the tag memory 210.

The reader/writer 100 checks the BI-DIR Parameters record, executes the NDEF read procedure, and acquires the NDEF message including the application data (step S402). As mentioned above, the NDEF message acquired by the reader/writer 100 here includes the Tag-MM record.

When the NDEF read procedure by the reader/writer 100 is completed, the tag host 220 is notified of the read completion notification from the tag memory 210 (step S403). Upon receiving the notification, the tag host 220 writes the NDEF message (NDEF additional message) held as additional data to the tag memory 210 (step S404).

When the reader/writer 100 acquires the NDEF message including the Tag-MM record in step S402, the reader/writer 100 determines that the tag 200 transmits the additional data by checking the Tag-MM record. The reader/writer 100 waits for the waiting time set in the MWT_READ to elapse, executes the NDEF read procedure, and acquires the NDEF message which is additional data (step S405). When the NDEF read procedure by the reader/writer 100 is completed, the tag host 220 is notified of the read completion notification from the tag memory 210 (step S406).

Since the number of NDEF additional messages held by the tag host 220 was one (NOM=1), the reader/writer 100 determines that the transmission from the tag 200 is completed, and executes, for example, the NDEF write procedure to write the NDEF message including the application data to the tag memory 210 (step S407). When the NDEF write procedure by the reader/writer 100 is completed, the tag memory 210 notifies the tag host 220 of the write completion notification (step S408).

Note that, here, the number of NDEF additional messages held by the tag host 220 is set to one (NOM=1), but it is not limited to this. The NOM may be two or more, and, in this case, the reader/writer 100 executes the NDEF read procedure the number of times set in the NOM. Note that in a case where the reader/writer 100 executes the NDEF read procedure the number of times set in the NOM, the reader/writer 100 every time waits for the waiting time set in the MWT_READ to elapse and executes the NDEF read procedure.

As described above, the control unit 120 of the reader/writer 100 (an example of the communication apparatus) performs reading from the tag memory 210 (an example of the memory) and then executes reading from the tag memory 210 on the basis of the NOM (an example of a parameter related to control of non-contact communication).

Furthermore, the control unit 120 of the reader/writer 100 (an example of the communication apparatus) performs reading from the tag memory 210 (an example of the memory) and then executes reading of the NDEF additional message (an example of the message) for the number based on the NOM from the tag memory 210.

Furthermore, the control unit 120 of the reader/writer 100 (an example of the communication apparatus) performs reading from the tag memory 210 (an example of the memory), and then waits for the time based on the MWT_READ (an example of a parameter related to control of non-contact communication) to elapse and executes reading from the tag memory 210.

Therefore, the tag 200, which is an example of the communication apparatus, can control communication with the reader/writer 100, which is an example of another communication apparatus. The tag 200 can transmit data of any size to, for example, the reader/writer 100.

4. Application Example

Figure 17:
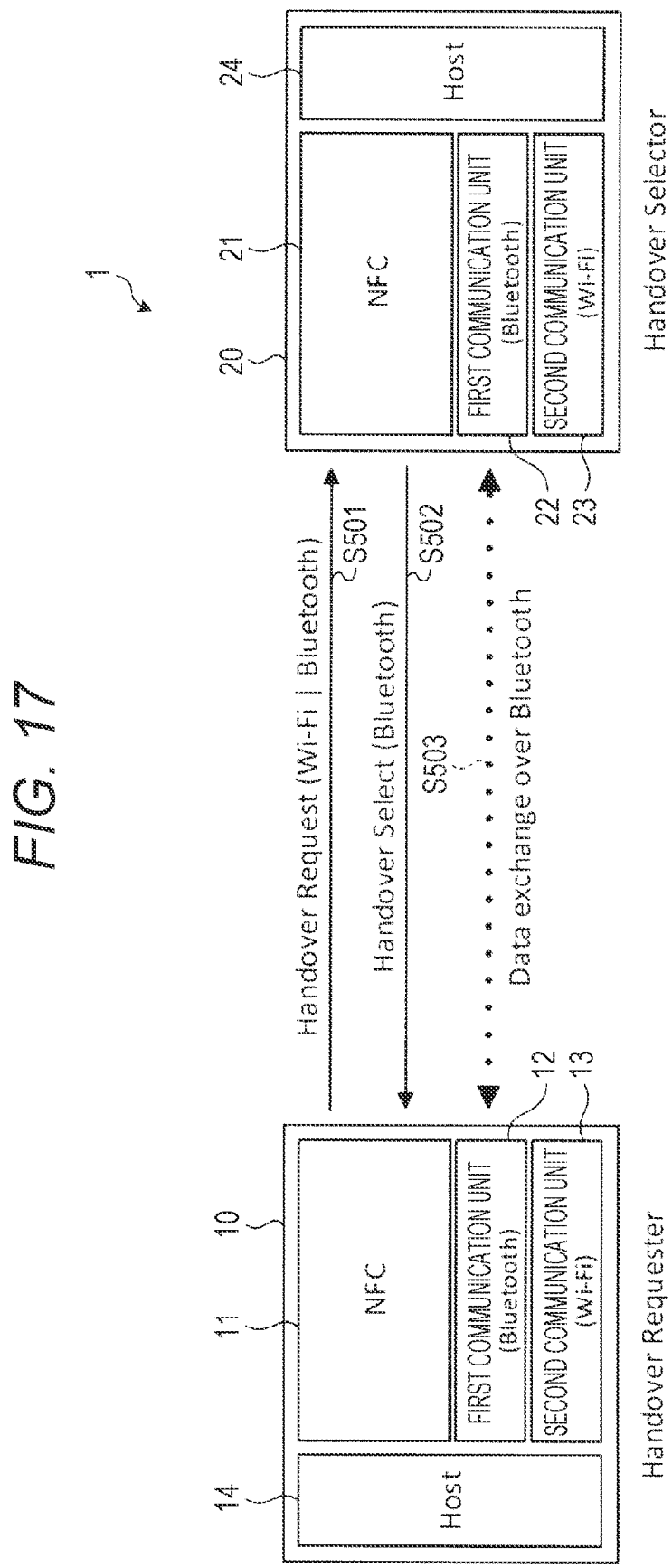
FIG. 17 is a diagram for explaining Negotiated Handover to which the technology according to the present disclosure can be applied.

An application example of the communication system 1 according to the first and second embodiments will be described with reference to FIG. 17. FIG. 17 is a diagram for explaining Negotiated Handover to which the technology according to the present disclosure can be applied.

As mentioned above, the NDEF bidirectional communication can be applied to the handover technology (Connection Handover) for a plurality of wireless communication methods. For example, the NDEF bidirectional communication can be applied to Negotiated Handover in the Connection Handover specification. The Connection Handover specification is specified in, for example, NFC Forum Connection Handover Technical Specification. Negotiated Handover is a specification in which another wireless communication apparatus can be started by exchanging parameters in the form of NDEF messages between two devices.

As shown in FIG. 17, the communication system includes two devices that perform Negotiated Handover: a Handover Requester 10 (hereinafter, also referred to as a requester 10) and a Handover Selector 20 (hereinafter, also referred to as a selector 20). The requester 10 requests the selector 20 to perform a handover to another communication by transmitting a request message. The selector 20 transmits a select message in response to the request message. Therefore, Negotiated Handover is executed between the requester 10 and the selector 20.

The requester 10 shown in FIG. 17 includes an NFC 11 corresponding to the reader/writer 100, first and second communication units 12 and 13 that perform another wireless communication, and a control unit 14. The first communication unit 12 performs communication by, for example, Bluetooth as another wireless communication. The second communication unit 13 performs communication by, for example, Wi-Fi (registered trademark) as another wireless communication. The control unit 14 controls each unit of the requester 10.

The selector 20 includes an NFC 11 corresponding to the tag 200, first and second communication units 22 and 23 that perform another wireless communication, and a control unit 24. The first communication unit 22 performs communication by, for example, Bluetooth as another wireless communication. The second communication unit 23 performs communication by, for example, Wi-Fi (registered trademark) as another wireless communication. The control unit 24 controls each unit of the selector 20.

Note that, here, it is assumed that the requester 10 and the selector 20 perform wireless communication by Bluetooth and Wi-Fi as wireless communication different from NFC, but it is not limited to this. For example, the requester 10 and the selector 20 may perform communication other than Bluetooth and Wi-Fi. Furthermore, the number of wireless communications other than NFC that can be performed by the requester 10 and the selector 20 is not limited to two, but may be one or three or more.

Furthermore, the wireless communication other than NFC supported by the requester 10 and the selector 20 may not be exactly the same for the requester 10 and the selector 20. For example, the requester 10 may not support Bluetooth. Thus, all or some of the wireless communications other than NFC supported by the requester 10 and the selector 20 may be the same.

As shown in FIG. 17, in a case where the requester 10 includes the reader/writer 100, the communication after the connection is established is started by the reader/writer 100 that transmits the request message. In this case, the selector 20 including the tag 200 performs setting, for example, in the initial entity of the BI-DIR Parameters record, so that the requester 10 starts from writing.

Therefore, when the connection with the selector 20 by NFC is established, the requester 10 executes the write procedure and transmits the request message to the selector 20. In FIG. 17, the requester 10 transmits the request message (NDEF message) requesting a handover to either Bluetooth or Wi-Fi, to the selector 20 (step S501).

The selector 20, which has received the request message, selects Bluetooth as wireless communication for performing a handover, and transmits the select message including the selection result to the requester 10 (step S502).

The selector 20 cannot transmit all select messages in a single read procedure, and in a case where subsequent additional data is held, the selector 20 transmits a select message (NDEF message) including the Tag-MM record indicating that the subsequent additional data is held.

Therefore, the requester 10 can receive the select message including the subsequent additional data according to the NOM and the MWT_READ included in the Tag-MM record.

The requester 10 and the selector 20 establish a Bluetooth connection using, for example, the parameters included in the request message and the select message, and switch the wireless communication to be used to Bluetooth. The requester 10 and the selector 20 execute subsequent data communication using Bluetooth (step S503).

Note that, here, the case where the requester 10 includes the reader/writer 100 and the selector 20 includes the tag 200 has been described, but it is not limited to this. For example, the requester 10 may include the tag 200 and the selector 20 may include the reader/writer 100.

In this case, the requester 10 transmits the request message, in other words, the communication is started from the tag 200. Therefore, the tag 200 uses the BI-DIR Parameters record and controls the reader/writer 100 so that the communication can be started from the transmission at the start of the communication.

In this way, since the tag 200 can control non-contact communication with the reader/writer 100, the device including the tag 200 can be either the requester 10 or the selector 20.

5. Other Embodiments

The processing according to each of the above-described embodiments may be carried out in various different forms other than each of the embodiments described above.

In each of the above-described embodiments, communication by NFC has been described as an example of the non-contact communication, but non-contact communication is not limited to this. For example, the non-contact communication may be communication by RFID.

6. Supplement

The preferred embodiment of the present disclosure has been described above with reference to the accompanying drawings, while the technical scope of the present disclosure is not limited to the above examples. It is apparent that a person having normal knowledge in the technical field of the present disclosure may find various alterations and modifications within the scope of the technical idea stated in the claims, and it should be understood that they will naturally come under the technical scope of the present disclosure.

Of the processing described in each of the embodiments described above, all or part of the processing described as being automatically performed can be performed manually, and alternatively all or part of the processing described as being performed manually can be automatically performed by a known method. In addition, the processing procedure, specific names, and information including various data and parameters shown in the document and drawings described above can be arbitrarily changed unless otherwise specified. For example, the various information shown in each drawing is not limited to the illustrated information.

Furthermore, each component of each of the illustrated apparatuses is a functional concept, and does not necessarily have to be physically configured as shown in the drawings.

That is, the specific form of distribution and integration of each apparatus is not limited to those shown in the drawings, and all or part thereof can be configured to be functionally or physically distributed and integrated in arbitrary units depending on various loads and usage situations.

Furthermore, the above-described embodiments and variation example can be appropriately combined as long as the processing contents do not contradict each other. Furthermore, in the embodiments described above, the microscope is taken as an example of the image processing apparatus, but the image processing of the present disclosure can be applied to an imaging device other than the microscope.

Furthermore, the effects described in this specification are merely illustrative or exemplified effects, and are not limitative. That is, with or in the place of the effects described above, the technology according to the present disclosure may achieve other effects that are clear to those skilled in the art from the description of the present specification.

Note that the configuration below also falls within the technical scope of the present disclosure.

(1)

A communication apparatus that performs non-contact communication with an external apparatus via a memory of the external apparatus, the communication apparatus including:

a control unit that receives a message including a parameter related to control of the non-contact communication and performs the non-contact communication with the external apparatus on the basis of the parameter.

(2)

The communication apparatus according to (1), in which the control unit executes writing to the memory or reading from the memory on the basis of the parameter.

(3)

The communication apparatus according to (1) or (2), in which the control unit determines which to start from, the writing to the memory or the reading from the memory, in a case where the non-contact communication is performed on the basis of the parameter.

(4)

The communication apparatus according to any one of (1) to (3), in which the control unit performs the reading from the memory and then executes the reading from the memory on the basis of the parameter.

(5)

The communication apparatus according to (4), in which the control unit performs the reading from the memory and then waits for a time based on the parameter to elapse and executes the reading from the memory.

(6)

The communication apparatus according to (4) or (5), in which the control unit performs the reading from the memory and then reads messages, a number of which is based on the parameter, from the memory.

(7)

The communication apparatus according to any one of (1) to (6), in which the non-contact communication includes communication by NFC.

(8)

The communication apparatus according to any one of (1) to (7), in which the message includes an NDEF message.

(9)

A communication apparatus that includes a memory and performs non-contact communication with an external apparatus via the memory, the communication apparatus including:

a control unit that generates a parameter for controlling the external apparatus in a case where the non-contact communication is performed and transmits a message including the parameter to the external apparatus.

(10)

The communication apparatus according to (9), in which the control unit generates the parameter for instructing the external apparatus to execute one of writing to the memory or reading from the memory.

(11)

The communication apparatus according to (9) or (10), in which the control unit generates the parameter for designating which to start from, the writing to the memory or the reading from the memory, is a case where the non-contact communication is performed.

(12)

The communication apparatus according to any one of (9) to (11), is which the control unit performs the reading from the memory and then generates the parameter for giving an instruction to execute the reading from the memory on the basis of the parameter.

(13)

The communication apparatus according to (12), in which the control unit performs the reading from the memory and then generates the parameter for specifying waiting time until execution of the reading from the memory.

(14)

The communication apparatus according to (12) or (13), in which the control unit performs the reading from the memory and then generates the parameter for designating the number of messages to be read from the memory.

(15)

A communication method for performing non-contact communication with an external apparatus via a memory of the external apparatus, the communication method including:

receiving a message including a parameter related to control of the non-contact communication; and performing the non-contact communication with the external apparatus on the basis of the parameter.

(16)

A communication method for performing non-contact communication with an external apparatus via a memory, the communication method including:

generating a parameter for controlling the external apparatus in a case where the non-contact communication is performed; and transmitting a message including the parameter to the external apparatus.

REFERENCE SIGNS LIST

1 Communication system
100 Reader/writer
110 Communication unit
120 Control unit
200 Tag
210 Tag memory
220 Tag host

The invention claimed is:

1. A communication apparatus configured to perform non-contact communication with an external apparatus via a memory of the external apparatus, the communication apparatus comprising:
a control unit configured to
receive a message including a parameter related to control of the non-contact communication, and
perform the non-contact communication with the external apparatus based on the parameter,
wherein the parameter related to the control of the non-contact communication indicates a number of additional messages to be subsequently transmitted,
wherein the parameter related to the control of the non-contact communication further indicates a minimum waiting time before a next message of the additional messages is to be subsequently transmitted, and
wherein the control unit is implemented via at least one processor.

2. The communication apparatus according to claim 1, wherein the control unit is further configured to execute writing to the memory or perform reading from the memory based on the parameter.

3. The communication apparatus according to claim 2, wherein the control unit is further configured to determine which to start from, executing the writing to the memory or performing the reading from the memory, in a case where the non-contact communication is performed based on the parameter.

4. The communication apparatus according to claim 3, wherein the control unit performs the reading from the memory and then executes a next reading from the memory based on the parameter.

5. The communication apparatus according to claim 4, wherein the control unit performs the reading from the memory and then the control unit is further configured to
wait for a waiting time to elapse, the waiting time being based on the parameter, and
execute the next reading from the memory after the waiting time has elapsed.

6. The communication apparatus according to claim 5, wherein the control unit performs the reading from the memory and then reads at least one of the additional messages, the number of the additional messages being based on the parameter, during the next reading from the memory.

7. The communication apparatus according to claim 6, wherein the non-contact communication includes communication by NFC.

8. The communication apparatus according to claim 7, wherein the message includes an NDEF message.

9. The communication apparatus according to claim 1, wherein the minimum waiting time is determined based on an amount of time required to finish writing the next message.

10. A communication apparatus that includes a memory, the communication apparatus being configured to perform non-contact communication with an external apparatus via the memory, and the communication apparatus comprising:
a control unit configured to
generate a parameter for controlling the external apparatus in a case where the non-contact communication is performed, and
transmit a message including the parameter to the external apparatus,
wherein the parameter for controlling the external apparatus indicates a number of additional messages to be subsequently transmitted,
wherein the parameter related to the control of the non-contact communication further indicates a minimum waiting time before a next message of the additional messages is to be subsequently transmitted,
wherein the memory is implemented via at least one non-transitory computer-readable storage medium, and
wherein the control unit is implemented via at least one processor.

11. The communication apparatus according to claim 10, wherein the control unit generates the parameter for instructing the external apparatus to execute one of writing to the memory or reading from the memory.

12. The communication apparatus according to claim 11, wherein the control unit generates the parameter for designating which to start from, executing the writing to the memory or performing the reading from the memory, in a case where the non-contact communication is performed.

13. The communication apparatus according to claim 12, wherein the control unit performs the reading from the memory and then generates the parameter for giving an instruction to execute a next reading from the memory based on the parameter.

14. The communication apparatus according to claim 13, wherein the control unit performs the reading from the memory and then generates the parameter for specifying a waiting time until execution of the next reading from the memory.

15. The communication apparatus according to claim 14, wherein the control unit performs the reading from the memory and then generates the parameter for designating a number of the additional messages to be read from the memory.

16. A communication method for performing non-contact communication with an external apparatus via a memory of the external apparatus, the communication method comprising:
receiving a message including a parameter related to control of the non-contact communication; and
performing the non-contact communication with the external apparatus based on the parameter,
wherein the parameter related to the control of the non-contact communication indicates a number of additional messages to be subsequently transmitted,
wherein the parameter related to the control of the non-contact communication further indicates a minimum waiting time before a next message of the additional messages is to be subsequently transmitted, and
wherein the memory is implemented via at least one non-transitory computer-readable storage medium.

17. A communication method for performing non-contact communication with an external apparatus via a memory, the communication method comprising:
generating a parameter for controlling the external apparatus in a case where the non-contact communication is performed; and
transmitting a message including the parameter to the external apparatus,
wherein the parameter related to the control of the non-contact communication indicates a number of additional messages to be subsequently transmitted,
wherein the parameter related to the control of the non-contact communication further indicates a minimum waiting time before a next message of the additional messages is to be subsequently transmitted, and
wherein the memory is implemented via at least one non-transitory computer-readable storage medium.

* * * * *